Patented June 11, 1929.

1,716,623

UNITED STATES PATENT OFFICE.

JOHN T. COLLINS, OF SANDWICH, MASSACHUSETTS; THOMAS M. VINSON ADMINISTRATOR OF SAID JOHN T. COLLINS, DECEASED.

COMPOSITION OF MATTER FOR MOLDING AND PROCESS OF MAKING THE SAME.

No Drawing. Application filed July 31, 1926. Serial No. 126,344.

This invention relates to improvements in compositions of matter for molding and in the process of making the same.

More particularly it relates to the ingredients which are to be combined, and the method of combining them for the preparation of materials which can be used in plastic form, as for the manufacture of articles whose shape is determined by molding under heat and pressure, and for other uses. One large field with which the utilities of the invention are identified is that in which the product known commercially as bakelite is so extensively used. It is one object of the present invention to provide materials and methods less expensive than those of bakelite for producing results which can serve many or all of the commercial purposes for which bakelite is used. It is another object to accomplish this without resort to the phenol-formaldehyde condensation process which is characteristic of the bakelite manufacture. Another and very important object is to provide a profitable market for materials which at present are considered as waste and are so treated, to wit, the "black liquor" resulting in the digestion of wood in the soda process and in the sulfate process, of making pulp from wood. Whereas it is customary in the manufacture of commercial products known as bakelite and others of like utility, to introduce a filler or mechanical carrier or binder of other materials such as ground wood, or sheets of paper which are impregnated with the active material, it is a purpose of the present invention to improve upon that phase of the bakelite process and cognate processes by the introduction of a binding agent which is of a fibrous nature and notable for its strength; and the introduction of this by a method which is simple, effective, and free from labor costs and costs for time and for machinery operation hitherto practiced, or at least in which the costs chargeable to the preparation of the binder are very much reduced below those heretofore known. In another aspect the invention amounts to the conversion of suitable woods, as for example, coniferous woods, which are likely to afford the greatest field for utility of the invention, into articles of plate or molded form, which are hard, smooth, strong, not readily subject to disintegration by any means, and capable of indefinite duration, having also good dielectric properties, insoluble and infusible. These objects are accomplished by the digesting of the wood as is already customary in the soda or sulfate process, thus separating it into its pulp or cellulosic material and non-cellulosic material; throwing down a precipitate from the latter by adding acid; beating the pulp and the precipitate thoroughly together. This makes a thick pasty mass from which liquid can be removed by pressure against a screen, and which when dry can be molded under heat and pressure to desired commercial form. The product obtained by precipitation from the black liquor, which is thought to be largely lignin and resin acids, can be handled in moist form for mixture with the moist pulp. The pulp having first been sized with rosin, after the manner practiced by paper manufacturers, in a beating engine, the precipitate can be added and the mixing continued in the same beating engine until the product is ready to be dried and molded. In the mold, an application of pressure of two to three thousand pounds per square inch at a temperature of three to four hundred degrees Fahrenheit, for a half an hour to an hour produces the final durable product. The importance of the simultaneous fibre-drawing, coating and intimate-mixing step then appears, for whereas the precipitate by itself had a vitreous fracture and but little strength, the final composition has a diminished and reluctant fracture, and can withstand greater preliminary stress and preliminary strain.

The materials and process described are also of value in connection with the typical bakelite process. In this case cresylic acid may be used for making the precipitate, and formaldehyde may be added and preliminarily mixed with the precipitated powder before the same is put into the beater with the pulp, and the rosin size would not be used on the pulp. The phenol and formaldehyde condensation product resulting from heat and pressure would then be intermingled with the other materials in the composition, the whole being bound thoroughly together.

In either event the product can be provided with a veneer facing by pressing a substance on the face of the mass in the mold, so as to give it the desired color or surface aspect according to methods already well known.

For an illustrative example one may consider the making of a thin hard board suitable for radio or electrical work. The digesting action having been completed in the soda process for the manufacture of pulp, the liquid with pulp floating in it is customarily blown from the digester into a wash tank having a screen bottom. The black liquor having been drained away, the pulp thus separated by the screen, after being washed with water to carry out all remaining alkali, is ready for its ordinary use in paper making, or according to the present invention for recombination with a derivative of the black liquor. In order to make the combination in desired proportions, while using the pulp in wet form, the net amount of pulp in the wet mass is to be ascertained. This is done by finding how much bone dry pulp results from the drying of a known quantity of the wet pulp, in the stage of wetness in which it is to be used. Likewise the precipitate from the black liquor may be used in wet form. The successful practice of the invention does not require that there be any precise and exact relation of quantity of pulp to quantity of the precipitate derived from the black liquor, but it will ordinarily be desired for commercial reasons to put them together in some specified proportion. It is here assumed for purposes of illustration that they are to be combined in equal parts. A suitable ratio is four pounds each of dry pulp and of precipitate with ten gallons of water, and rosin size to the extent desired, the amount required being materially less than equal parts with the pulp and precipitate, e. g. about 10% of the pulp.

The precipitate is obtained as follows: Add two pounds of commercial sulfuric acid to ten gallons of black liquor or use whatever amount of acid is suitable according to the strength of the black liquor. Upon stirring, a precipitate quickly forms which may be strained out by putting the whole on cotton sheeting through which a colorless liquid escapes. The precipitate upon being dried becomes a very dark powder, which embodies the non-cellulosic constituents of the original wood, including the lignin and in the case of coniferous woods the various resinous substances which characterize them in greater degree than other woods, all of which have hitherto gone to waste in the black liquor. This precipitate preferably may be purified by washing with water to remove water soluble solids and all substances that can be thus removed, and may be redissolved in caustic soda or other alkaline liquid and filtered to get rid of other impurities, and then reprecipitated by adding acid. In commercial practice it will be advisable to set apart a measured quantity of each batch of black liquor precipitate in either its crude or purified form, according to the plan which is to be followed, and thus to determine the net value of the wet stock in terms of dry precipitate content. This having been ascertained the quantity can be computed to know in what proportions to combine wet precipitate with the wet pulp.

The putting together of the ingredients may begin with the beating together of the pulp and the resin size, such as is used in the manufacture of paper, in a beating engine of the kind that is used in a paper mill. The entire estimated quantity of water having been added to the pulp the resin size is preferably to be mixed and beaten with it until it can be seen that the pulp is thoroughly covered with the rosin, making quite a heavy viscous liquid. The precipitate may then be added, with further beating until there is a uniform mixture. The time required for the beating is not long, and ordinarily in a small engine twenty minutes or less is enough in each case. The product which is a thick pasty mass can be put into a screen mold and there pressed against the screen to extrude liquid. When dried it constitutes a light, thick, friable, obviously fibrous sheet which is available for various uses, that to which reference is here made being its capability of being molded under heat and pressure to some desired commercial product. For example, to make a hard thin board or panel for radio or electrical uses, the sheet may be pressed between two highly polished plates, at a pressure of two thousand to three thousand pounds, and at a temperature varying from three hundred to four hundred degrees Fahrenheit for from one half an hour to an hour. The result is a smooth hard strong substance which, so far as my tests have gone, has such durability and other qualities as are likely to make it very useful in the arts. It appears likely that in the described molding operation a chemical reaction occurs. The product is a stiff, hard, strong plate; tough, but capable of being cut with a knife or saw; capable of receiving in the mold a smooth, glossy surface, and of retaining it, unaffected by humidity or liquid water, and non-warping; slowly combustible when laid on a bed of coals, but not fusible; and possessed of dielectric properties.

The color can be varied by dies or pigments applied before the heavy pressing. The surface may be veneered by laying paper, wood or other thin sheet on the face of the mass before the molding pressure is applied, in which case the veneer will adhere strongly.

The substance may be molded into various desired forms, and affords an inexpensive, convenient and durable product.

It will be understood that other varieties of pulp may be used for mixture with the black liquor precipitate, or materials other than pulp, for the function of this is that of a filler and binder. The length and strength of the pulp fibres developed in the treatment of coniferous woods by the soda process, coupled with the commercial advantage of having them already at hand at the locus where the liquor is produced without freight charges being applicable to either, makes it advantageous to use this variety of pulp, and makes in the result a conversion of the wood into the product described.

In the material which is thus molded the active material is the precipitate from the black liquor, which has a resinous aspect so that it may be commonly referred to as a wood gum. This is fusible, and under heat can be molded, but its molded product is not as strong as when a fibrous binder has been mixed with it; nor is the product of molding it at a low temperature, or the product obtained by pouring and casting it, equal to the product of molding at the high temperature and pressure stated, for the former are re-moldable under heat, while the latter appears to be fixed and seems not to yield to the application of a degree of heat equal to that under which it was formed. For commercial purposes, the gum may be sold as an article of commerce and transported in wet or dry condition. Drying may be accomplished by setting it out for sun drying or by evaporation in any dry room or by vacuum.

The wood gum may be used with advantage in connection with phenolic bodies and formaldehyde. For these purposes ordinary crude cresylic acid and formaldehyde may be preliminarily mixed with the wood gum in its powdered form before it is put into the beater with the pulp, and the rosin size applied to the pulp may be omitted. By the application of heat and pressure according to methods already known a product resembling bakelite is obtained; but this has the fibrous pulp element throughout its substance and also has the product of the wood gum. Under these circumstances it is a product so like that of the wood gum alone, without any bakelite or bakelite ingredients, that I am not able to say with exact certainty just what the composition is; but it would seem that if bakelite is formed as a condensation product of the phenol and formaldehyde this condensation product acts as a binder for the other material, while if it is not formed it is because the formaldehyde has reacted with the black liquor or its precipitate, giving it the property of setting quickly in the mold while the cresylic acid reacts with the gum making a compound that has good flowing properties or plasticity in the mold. If these ingredients are to be used they may also be applied by heating the black liquor, or the purified solution of its precipitate in caustic soda, with formaldehyde in the proportion of two parts of formaldehyde to one part of dissolved wood gum and obtaining an initial condensation, and then adding cresylic acid and heating again, the amount added being equal to the weight of the wood gum. Upon this acidification a precipitate separates which may be filtered and dried or may be compounded wet with pulp or other fibrous binder, giving a mixture which molds well and will set quickly under heat and pressure. In this variety of the process when the formaldehyde is added to the black liquor the solution may be heated up to near the boiling point of water and allowed to stand overnight. The odor of the formaldehyde disappears and this derived form of the gum when precipitated and molded has the property of setting quickly in the mold, so that there is reason to think that a separate compound is formed which is not identifiable with those produced under the processes known by the name of bakelite. But whatever may be the full explanation of the reaction it is evident that the wood gum or precipitate obtained from the black liquor plays an important part in contributing both bulk and properties of plasticity and tensile strength as does also the fibrous cellulosic ingredient with which it is thoroughly intermingled.

It thus has been shown that more than one derivative of black liquor may be used. The simplest derivative is the precipitate obtained by adding acid, and next to that the said purified form of the same; but an illustration has been given of a gum derived from a precipitate by chemical reaction; and any of these or others of the same type may effectively be utilized with fibrous material beaten, drawn and mixed together in pulpy stage by the close-set knives of a beating engine. The term "derivative" as used in the claim is therefore not restricted to the primary derivative obtained directly by acidification of the black liquor. Other resinous materials may be handled by the process. In the case of applying the beating engine with phenol and formaldehyde the action must be watched carefully and stopped before the mixture gets too stiff, as occurs by the beginning of reaction. When merely making a mechanical mixture of the precipitated gum and pulp the mixing can be carried much further; and the reduction of pulp to elemental masses of fibres is preferably accomplished only to such extent as does not result in cutting the fibres less than their natural length. In the dried product of the mixture the aspect is distinctly that of a fibrous body; and such a sheet having for example three-fourths of an inch of thickness may be converted by simply heat and pressure to a sheet having say an eighth of an inch thickness which is neither pliable nor possessed of any fibrous aspect. In the case of treatment of a sheet by heat and pressure this is for the purpose hereof treated as being a molding of the material.

I claim as my invention:

1. A composition adapted to be transformed into a hard, molded substance by heat and pressure, comprising a mass of finely separated fibres throughout which mass there is distributed a gummy derivative of black liquor.

2. A composition adapted to be transformed into a hard, molded substance by heat and pressure, comprising a fibrous mass of cellulosic material in which the fibres are finely separated from each other and loosely adhering together, and intimately intermingled with a gummy derivative of black liquor.

3. A composition adapted to be transformed into a hard, molded substance by heat and pressure, comprising a mixture of a gummy derivative of black liquor and a finely divided wood product.

4. A composition adapted to be transformed into a hard, molded substance by heat and pressure, comprising a body of cellulosic material finely separated into fibrous elemental masses which are individually coated with a gummy derivative of black liquor.

5. A composition adapted to be transformed into a hard, molded substance by heat and pressure, comprising a mixture of a gum precipitated from black liquor and a finely separated fibrous mass of cellulosic material in which the fibres retain approximately their natural lengths.

6. A composition adapted to be transformed into a hard, molded substance by heat and pressure, comprising a mixture containing as ingredients a gum precipitated from black liquor and a finely divided fibrous substance.

7. A composition adapted to be transformed into a hard, molded substance by heat and pressure, comprising a mechanical mixture of a gum precipitated from black liquor and other substances which, independently of the gum, are capable by mutual reaction of making a hard, molded product.

8. A composition adapted to be transformed into a hard, molded substance by heat and pressure, comprising a mixture of a gum precipitated from black liquor and a partial condensation product of phenol and formaldehyde.

9. An intermediate product adapted to be converted by heat and pressure to a dense, hard, molded final product comprising a mass resulting from the intimate mechanical mixture of a finely divided gummy precipitate from black liquor with pulp which has been produced from wood by the process in which the black liquor is produced.

10. An intermediate product adapted to be converted by heat and pressure to a dense, hard, molded final product comprising a dried, porous mixture of a gummy derivative from black liquor with a finely divided fibrous substance.

11. An intermediate product adapted to be converted by heat and pressure to a dense, hard, molded final product comprising a dried, porous mixture of a gummy precipitate from black liquor with pulp which has been produced from wood by the process in which the black liquor is produced.

12. A composition of matter, being a dense and hard final product, comprising a derivative of a mixture of a finely divided fibrous substance with a gummy precipitate of black liquor.

13. A preliminary process for making a molded product comprising the mixing together of a fibrous substance and a gummy derivative of black liquor, meanwhile subjecting the aggregate to drawing forces between close set mechanically moving elements which by friction and abrasion subdivide the fibrous masses finely and coat them with the gum.

14. A preliminary process for making a molded product comprising the intimate mechanical mixing of a finely divided gum precipitate from black liquor with a finely divided fibrous substance; and then forming the mixture into a mass throughout which both ingredients are uniformly distributed; the said mass being an intermediate product adapted to be converted by heat and pressure to a dense, hard, molded, final product.

15. A process for making a molded product comprising the preliminary forming of a light, thick porous, dry sheet throughout the whole of which there are distributed a fibrous substance and a gummy derivative from black liquor; and then subjecting the mixture to the action of heat and pressure by which the gum becomes fluid, and the fibres greatly compressed together in a thin sheet, followed by cooling, so that the gum solidifies and holds the fibres thus compressed, and the fibres strengthen the gummy structure.

16. A process for making a molded product comprising the intimate mechanical mixing in water of a finely divided gummy derivative of black liquor with a finely divided fibrous substance; spreading the mixture while wet and drying it; heating and compressing the mixture to final form; and cooling the whole in final form, whereby a hard mass results, free from fibrous aspect.

17. A process for making a molded product comprising the making of pulp and black liquor by cooking process, and separating the black liquor from the pulp; adding acid to the black liquor and obtaining a precipitate; separating the precipitate; mixing the precipitate and the pulp together wet; drying the mixture; and applying heat and pressure to the mixture to make a tough, hard molded product.

18. A process for making a molded product comprising the making of pulp and black liquor by cooking process; obtaining a precipitate from the black liquor by adding acid; mixing the pulp and precipitate and separating the liquid; drying the mixture; and applying heat and pressure to the mixture.

19. An intermediate product, comprising a light, friable mass of fibrous aspect embodying an intimate mechanical mixture of a fibrous substance with a gummy derivative of black liquor, and capable of being converted into a dense, hard and tough mass having resinous rather than fibrous aspect.

Signed at Boston, Massachusetts, this sixteenth day of February, 1926.

JOHN T. COLLINS.